No. 881,194. PATENTED MAR. 10, 1908.
W. F. MOUGHLER.
DUST SEPARATOR AND COLLECTOR.
APPLICATION FILED MAR. 2, 1907.
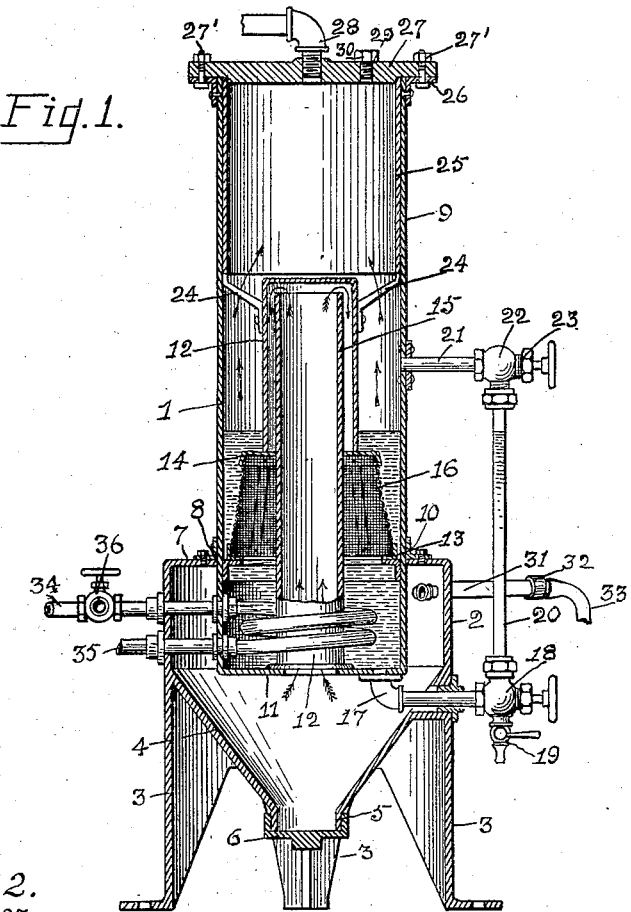
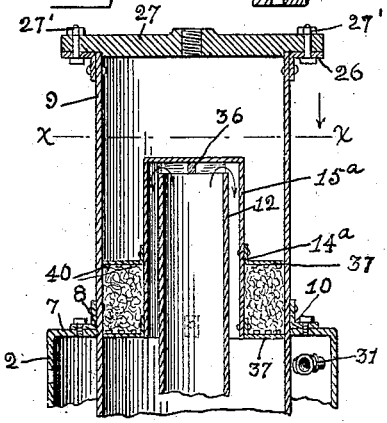
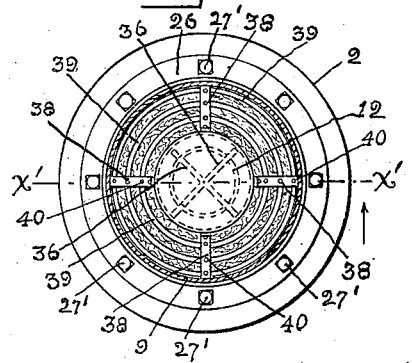
WITNESSES:
D. C. Walter
Grace Cowdrick
INVENTOR.
William F. Moughler
by Robt. B. Wilson
Attorney

UNITED STATES PATENT OFFICE.

WILLIAM F. MOUGHLER, OF TOLEDO, OHIO, ASSIGNOR TO THE VACUUM AND COMPRESSOR COMPANY, OF WAUSEON, OHIO, INCORPORATED.

DUST SEPARATOR AND COLLECTOR.

No. 881,194.      Specification of Letters Patent.      Patented March 10, 1908.

Application filed March 2, 1907. Serial No. 360,241.

*To all whom it may concern:*

Be it known that I, WILLIAM F. MOUGHLER, a citizen of the United States, residing at Toledo, in the county of Lucas and State of Ohio, have invented a new and useful Improvement in Dust Separators and Collectors, of which the following is a specification.

My invention relates to a dust separator and collector, and has for its object to provide an apparatus whereby the dust that is taken up by the suction of a vacuum is separated from the air before it reaches the means of producing a vacuum and retained in the apparatus, whereby the fouling and clogging of the means of producing the vacuum is prevented.

In application Serial No. 295,547, I have shown my invention connected to a combined vacuum pump and compressor, and forming a part of a dust renovating system, wherein the air drawn through a suction tool by the vacuum created by the pump is purified by my separator before it enters the cylinder of the pump, and is compressed in the cylinder and used as a blast, either separately or in combination with the suction tool, but my invention is not specifically claimed in said application and is now made the subject of this separate individual application.

I accomplish the objects of my invention by the construction and combination of parts as hereinafter described, claimed and illustrated in the drawings, in which Figure 1 is a longitudinal vertical section of a dust separator and collector constructed in accordance with my invention. Fig. 2 is a similar view with the lower portion broken away, showing a modified form of screen, and Fig. 3 is a cross section on line *x—x* of Fig. 2.

In the drawings 1 represents my separator, which comprises the base cylinder 2, which is mounted on suitable legs or standards 3, and has its lower end portion 4 conically reduced and provided with a central spout 5 having a closure cap 6. The top 7 of the base cylinder 2 is provided with a central opening 8 of a diameter to closely receive the lower end portion of the cylinder 9, which is provided with a circumferential flange 10 which supports the cylinder 9 in the top of the base cylinder 2, with the lower portion of the cylinder 9 extending a distance into the upper portion of the base cylinder. The lower end of the cylinder 9 is closed by a bottom 11 having central thereof and axial to the cylinder an open pipe 12, extending a suitable distance towards the top of the cylinder 9. In the lower portion of the cylinder above the bottom 11 is provided an annular ledge 13, which forms a base support for an inverted screen cap 14, having a central tubular portion 15, closed at the top end and adapted to loosely receive the upper end portion of the open pipe 12, and an enlarged and conically flared cup shaped screen portion 16, the lower rim of which rests on the annular base ledge 13, and supports the cap with the closed end of the tubular portion 15, above the upper end of the open tube or pipe 12.

The bottom 11 of the cylinder 9 is provided with a discharge pipe 17, which extends downward through the wall of the conically reduced portion 4 of the base cylinder 2, and has coupled to its outer end portion a tee 18, which has coupled to its lower end a draw off cock 19, and in its upper end is fitted the lower end of a glass sight tube 20. From a point above the flared screen portion of the cap 14, there is tapped into the cylinder 9 the pipe 21, which has coupled to its outer end a tee 22, having a branch in line with and adapted to receive the upper end of the glass sight tube 20, and the outer end of the tee 22 is provided with a closure valve 23.

The tubular portion 15 of the screen cap 14 is provided with radial spider arms 24, which extend to the wall of the cylinder 9, and are adapted to hold the tubular portion 15 concentric to the pipe 12, and to support an inner cylinder 25 telescopically inserted in the upper end portion of the cylinder 9, with the upper end of the inner cylinder 25 flush with the upper end of the cylinder 9.

The top of the cylinder 9 is provided with a concentric flange 26, to which is secured the closure head 27 by bolts 27'. The head 27 is centrally provided with an internally threaded orifice into which is suitably coupled one end of a pipe 28, extending and connected to the intake of a vacuum pump (not shown). The head 27 is also preferably provided with an internally threaded orifice 29 which is provided with a closure plug 30, for a purpose hereinafter described.

Into the upper portion of the cylinder 2 above the lower end of the cylinder 9 there is tapped a pipe 31, the opposite end of which is provided with one or more valve controlled nipples 32, for the attachment thereto of one or more hose pipes 33 of a suitable length, the opposite ends of which are provided with couplings adapting them to be coupled to suitable suction tools (not shown).

The separator thus constructed being connected by the pipe 31 with the intake of a vacuum pump, and the hose pipe or pipes 33 being connected to suitable suction tool or tools, and the cylinder 9 being partly filled with water through the orifice 29 in the head 27, until the water level is slightly above the flared screen portion of the cap 14, and the orifice 29 being closed by the plug 30, when the vacuum pump is operated, a partial vacuum is created in the cylinder 9 above the water level which causes the air to be drawn through the suction tool connected to the hose pipe 33, through the pipe 33 into the top portion of the cylinder 2, thence around the lower portion of the cylinder 9 and upward through the pipe 12, thence downward through the tubular portion 15 of the cap screen 14, and through the screen and the water covering the screen, whereby the dust drawn in with the air through the suction tool is washed out of the air, which passes to the cylinder of the vacuum pump through the pipe 31 purified.

The pipe 33 enters the top portion of the cylinder 2 above the lower end of the cylinder 9, and within the cylinder 2 is provided with an ell whereby the dust laden air drawn through the pipe 33 is caused to whirl about the lower end of the cylinder 9 by the suction at the upper end, and as thus whirled about the lower end of the cylinder 9 the heavier portions of the dust are thrown off centrifugally and drop into the lower portion of the cylinder 2 and are collected in the conically reduced portion 4 of the cylinder 2, from which it is readily removed by removing the closure cap 6 from the spout 5. The lighter and more impalpable portions of the dust are carried up through the pipe 12 and are washed out of the air as it passes through the water and the screen, as before described.

When the water in the cylinder 9 becomes overcharged with the dust thus taken up and dissolved therein, the polluted water may be discharged through the discharge pipe 17, and replaced with fresh water as before described. I have found in the practice of thus drawing the air through the water in the collector 1 that the air is not only purified of any dust that is drawn in with it, but it is also largely relieved of any moisture that it may have absorbed, and it is made drier and better adapted for compression. Preferably, also, to prevent the water in the separator being reduced to a low temperature by the rapid passage of air through it, a pipe 34 is connected at one end to the exhaust of the engine (not shown), which operates the pump, and extends into the lower portion of the cylinder 9 of the separator in a coil around the base of the cylinder, and thence to the atmosphere through the exit 35. The pipe 34 is also provided with a two-way closure valve 36, the valve being adapted, when closing the pipe to the cylinder, to permit the exhaust to escape through one way of the valve to the atmosphere, and when open, to direct the exhaust through the separator coil to the exit 35.

By means of the pipe 34, the heat of the exhaust is utilized to maintain the temperature of the water at about blood heat, at which temperature I have found that the dust is more readily dissolved and taken up by the water, whereas without the water being heated, it becomes chilled by the rapid passage of air through it, and the air retains a greasy substance which is carried by the air through the pipe 33, and collects in small quantities at the intake valves of the pump, which a low degree of heat in the water wholly prevents.

In Figs. 2 and 3 are shown a modified form of screen cap $14^a$, having a central tubular cap portion $15^a$, closed at the top end and provided with the inner cross ribs 36 which support the cap on the upper end of the open pipe 12.

At the lower end of the cap tube $15^a$, and at a suitable distance above are secured the concentric spider flanges 37 each comprising the radial bars 38 extending to the wall of the cylinder 9 and connected by the concentric wire rings 39. The radial bars 38 of the upper and lower spiders 37 are connected by the vertical wires 40. In the cage thus formed is packed a screen 41 preferably formed of curled hair or other similar fibrous material.

The top spider flange of the screen cap thus formed may extend above the level of the water seal of the air passage between the pipe 12 and the cap tube $15^a$ and in operation, as the air passes upward through the water seal, the water forms a foam in the upper portion of the screen which catches any dust that may have passed the seal, and is there dissolved and is carried back into the body of the water as the bubbles are broken up by the screen and descend by gravity through the screen to the body of the water below.

What I claim to be new is—

1. In a dust separator and collector, the combination of an exhaust chamber having an outlet adapted to be connected to a vacuum pump, a receiving chamber having an air inlet, an air passage connecting the chambers, a liquid seal normally closing the air passage, means to heat the liquid forming the seal, and a suction pipe connected to the air inlet of the receiving chamber, substantially as and for the purpose set forth.

2. In a dust separator and collector, the combination of an exhaust chamber having an outlet adapted to be connected to a vacuum pump, a receiving chamber having an air inlet, an air passage connecting the chambers, a liquid seal normally closing the air passage, means to heat the liquid forming the seal, a screen interposed in the path of exit of the air drawn through the seal, and a suction pipe connected to the air inlet of the receiving chamber, substantially as and for the purpose set forth.

3. In combination in a dust separator and collector, a receiving cylinder, an exhaust cylinder mounted on and partially in the receiving cylinder, and having an open pipe axial thereto forming an air passage from the receiving into the exhaust cylinder, a screen surrounding the pipe within the exhaust cylinder, having a surmounting cap concentrically inclosing the upper portion of the pipe, and forming an air passage, downward and around the pipe, liquid in the exhaust cylinder submerging the screen, and forming a seal for the air passage between the cap and the pipe, a pipe adapted to connect the air space of the exhaust cylinder with an air exhaust pump, and thereby draw air from the receiving chamber through the liquid sealed passage, and a suction pipe connected to the receiving cylinder, substantially as and for the purpose set forth.

4. In combination in a dust separator and collector, a receiving cylinder, an exhaust cylinder mounted on and partially in the receiving cylinder, and having an open pipe axial thereto forming an air passage from the receiving into the exhaust cylinder, a screen surrounding the pipe within the exhaust cylinder having a surmounting cap concentrically inclosing the upper portion of the pipe, and forming an air passage, downward and around the pipe, liquid in the exhaust chamber submerging the screen, and forming a seal for the air passage between the cap and the pipe, means to heat the liquid in the exhaust cylinder, a pipe adapted to connect the air space of the exhaust cylinder with an air exhaust pump, and thereby draw air from the receiving chamber through the liquid sealed passage, and a suction pipe connected to the receiving cylinder, substantially as and for the purpose set forth.

5. In combination in a dust separator and collector, a receiving cylinder, an exhaust cylinder mounted on and partially in the receiving cylinder, and having an open pipe axial thereto forming an air passage from the receiving into the exhaust cylinder, a screen surrounding the pipe within the exhaust cylinder, having a cap concentrically inclosing the upper portion of the pipe, and forming an air passage, downward and around the pipe, liquid in the exhaust chamber submerging the screen, and forming a seal for the air passage between the cap and the pipe, a heating pipe in the lower portion of the exhaust chamber having one end portion extending to and adapted to be connected to the exhaust of an engine, and the opposite end open to the atmosphere without the cylinder, a pipe adapted to connect the air space of the exhaust cylinder with an air exhaust pump, and thereby draw air from the receiving chamber through the liquid sealed passage, and means to supply air to the receiving cylinder, substantially as and for the purpose set forth.

In witness whereof, I have hereunto signed my name in the presence of two subscribing witnesses, this 27th day of February, 1907.

WILLIAM F. MOUGHLER.

In presence of:
Wm. J. Fritsche,
Walter J. Toepfer.